(No Model.)

A. LINDGREN.
WHEEL CULTIVATOR.

No. 296,760. Patented Apr. 15, 1884.

Attest.
Sidney P. Hollingsworth
Harry Shipley

Inventor.
August Lindgren
By his Attorney
Philip T. Dodge.

UNITED STATES PATENT OFFICE.

AUGUST LINDGREN, OF MOLINE, ILLINOIS, ASSIGNOR TO THE MOLINE PLOW COMPANY, OF SAME PLACE.

WHEEL-CULTIVATOR.

SPECIFICATION forming part of Letters Patent No. 296,760, dated April 15, 1884.

Application filed January 5, 1884. (No model.)

*To all whom it may concern:*

Be it known that I, AUGUST LINDGREN, of Moline, in the county of Rock Island and State of Illinois, have invented certain Improvements in Wheeled Cultivators, of which the following is a specification.

This invention relates to those machines which consist of a wheeled frame provided with independent shovel-carrying beams, which are jointed thereto in such manner as to swing both laterally and vertically, and more particularly to machines which are designed to be operated at will by an attendant riding thereon or walking in rear thereof.

The invention consists in an improved combination and arrangement of hand and foot levers for elevating the beams and for regulating their descent.

Figure 1:
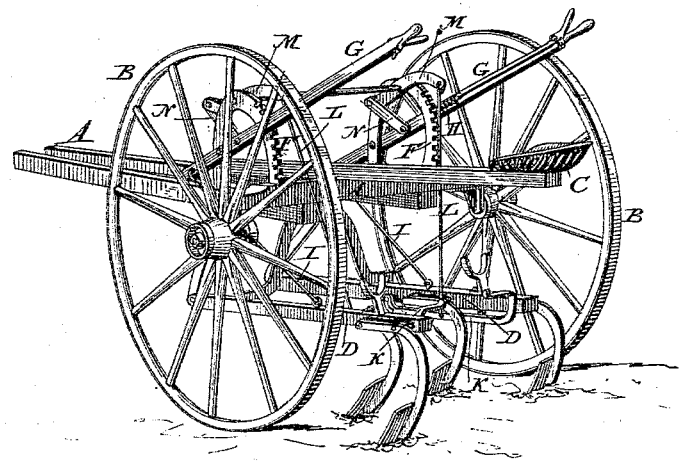
Figure 2:
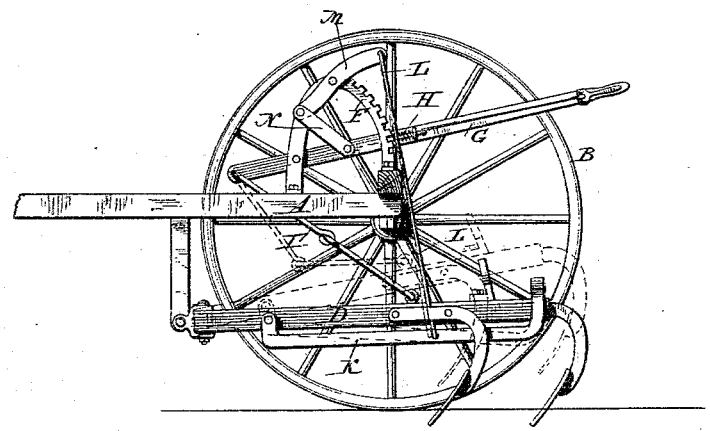

Referring to the accompanying drawings, Figure 1 represents a perspective view of a machine having my improvements embodied therein. Fig. 2 represents a longitudinal vertical section, showing one of the beams and its connections.

Referring to the drawings, A represents the main frame, B the two ground-wheels upon which it is carried, C the driver's seat, and D D the two beams or drag-bars to which the shovels are attached, and the forward ends of which are jointed to the main frame in such manner that they may swing both horizontally and vertically.

The foregoing parts may be constructed and arranged in any ordinary or approved manner, my invention having particular reference to a beam-controlling device, which I will now describe.

Above each beam I bolt firmly to the main frame an upright plate, F, the edge of which is provided with notches, and to this plate I pivot a hand-lever, G, provided with a dog or locking device, H, arranged to engage in the notches for the purpose of locking the lever in position. To the forward end of this lever, which should be located as nearly as convenient above the point at which the beam is jointed to the frame, I attach a jointed rod or chain, I, which is extended thence forward and downward to an eyebolt or other connection on the beam.

The hand-lever and the link jointly serve as a means by which the beam may be positively lifted and locked above an operative position, or suspended in an operative position, with the shovels at such height as may be required.

While the link and lever serve, as stated, to suspend the beam in an operative position and limit its descent, they permit it to be lifted at will without changing the position of the hand-lever.

For the purpose of enabling the operator to conveniently lift the beam while riding on the machine, I provide a horizontal foot-lever, K, and pivot its forward end to the side of the beam or drag-bar, arranging its rear end in a convenient position to be acted upon by the foot of the driver while riding on the seat. The foot-lever is fulcrumed or suspended at its middle on the lower end of an upright rod, L, the upper end of which is pivoted to the rear end of a short lever, M, pivoted to the side of the before-mentioned plate F, on the main frame. From the forward end of this lever M a link, N, is extended downward to the hand-lever G, at a point in rear of its fulcrum.

It will be observed that the rod L and lever M serve as a means for suspending or supporting the foot-lever, and that the sustaining devices may be adjusted and locked rigidly in position by means of the hand-lever with which they are connected. On depressing the lower end of the foot-lever K, which moves on the lower end of the rod L as a center, its forward end is caused to elevate the beam, and thus the operator riding on the machine is enabled, without changing the position of the hand-lever and without changing the adjustment of the devices which limit the descent of the beam, to effect the elevation of the beam by a simple pressure on the rear end of the foot-lever. When the hand-lever is depressed, the effect is to elevate the suspension-rod L, and thus elevate the beam and limit its descent to a point higher than that originally fixed. At the same time that the hand-lever thus acts upon the suspension devices it causes the link N to operate the lever M and lift the rod L, so that the foot-lever K is caused to rise with the beam and to retain an unchanged position with respect thereto.

It is to be noted as a peculiarity of my machine, that the device I, for suspending the beam or limiting its descent, is entirely independent of the foot-lever K and its link L, which elevates the beam when in action. In other words, the devices for suspending the beam and the foot-levers for adjusting the beam are independent of each other, although both are connected with devices by which they may be simultaneously adjusted.

In the ordinary operation of the machine, the rising-and-falling motion of the beam is controlled by means of the foot-lever, the hand-lever and its connection remaining at rest; but when walking behind the machine so that he cannot make use of the foot-lever, the operator may effect the adjustment of the beam and shovel by means of the hand-lever.

I am aware that a foot-lever pivoted to the side of a shovel-beam has been suspended by a chain adjustably connected to the main frame, the same chain serving also as the only means of supporting the beam.

I am also aware that a beam has been connected with a hand-lever by which it could be adjusted vertically, and provided with a foot-lever connected thereto by a chain passing over a pulley on the frame, in such manner that the depression of the foot-lever would elevate the beam, there being no connection whatever between the foot-lever and the hand-lever. To such constructions I lay no claim.

Having thus described my invention, what I claim is—

1. The wheeled frame and the shovel-beam jointed thereto, in combination with a laterally-swinging suspension device for said beam, a foot-lever pivoted to the beam, an independent suspending device for said lever, and a hand-lever and locking devices mounted on the frame, and connected to the beam-suspending and also to the lever-suspending devices, substantially as described, whereby the two suspension devices may be adjusted simultaneously.

2. In a cultivator, the combination of the following members: the wheeled frame, a vertically-swinging shovel-beam, a hand-lever mounted on the frame and provided with locking devices, a beam-suspending device extending directly from said lever to the beam, a foot-lever pivoted to the beam, and an independent suspending device for said foot-lever connected to the hand-lever, substantially as described, whereby the movement of the hand-lever is caused to adjust the beam and also adjust independently the fulcrum of the foot-lever.

3. In a cultivator, the combination of the wheeled frame, the shovel-beam, the hand-lever, and devices to lock the same mounted on the frame, the link or chain extending from the hand-lever to the beam, the foot-lever M, pivoted to the beam, the lever mounted on the frame, and the connecting devices extending from opposite ends of said lever to the hand-lever and the beam, respectively.

AUGUST LINDGREN.

Witnesses:
 A. R. BRYANT,
 GEO. STEPHENS.